INVENTOR
MANDO S. ARIENS
BY 
ATTORNEYS

Nov. 4, 1952 M. S. ARIENS 2,616,348
ROTARY TILLER

Filed Oct. 12, 1946 7 Sheets—Sheet 5

INVENTOR
MANDO S. ARIENS

BY

ATTORNEYS

Nov. 4, 1952 — M. S. ARIENS — 2,616,348
ROTARY TILLER
Filed Oct. 12, 1946 — 7 Sheets-Sheet 7

INVENTOR
MANDO S. ARIENS

ATTORNEYS

Patented Nov. 4, 1952

2,616,348

UNITED STATES PATENT OFFICE 2,616,348

ROTARY TILLER

Mando S. Ariens, Brillion, Wis.

Application October 12, 1946, Serial No. 702,969

12 Claims. (Cl. 97—40)

This invention appertains to tillers, cultivators, and the like, and more particularly to an improved rotary row cultivator and is an improvement over my prior Patents Nos. 2,025,494, 2,347,017 and 2,364,043, issued to me respectively on December 24, 1935, April 18, 1944 and December 5, 1944.

In my prior Patent No. 2,364,043 is shown a plurality of rotary tiller or cultivator units suspended from a tractor between the front and rear wheels thereof. While this assembly effectively accomplishes its purpose and is satisfactory in the field, some difficulty is experienced in guiding the tractor straight down the rows with the rotary working implements in proper relation to the growing plants.

It is therefore one of the primary objects of my invention to provide novel means for carrying the rotary earth working units at the front of the tractor and in full view of the operator on the tractor, whereby the operator can conveniently and quickly line up the units with the rows and maintain the units in proper working relation relative to the rows.

Another object of my invention is to provide novel means under the control of the operator of the tractor for lifting the earth working units above the ground whereby to avoid obstructions and to permit the convenient turning of the tractor, etc.

Another salient object of my invention is to provide a new and simplified mechanism under the control of the operator for simultaneously raising and lowering all of the tiller units and still permit independent movement of the units as the same travel over uneven ground.

A further important object of my invention is to provide novel means for constructing and mounting the individual units on the wheeled frame, whereby a sturdy compact structure will be had and whereby the units can be adjusted relative to the ground so that the ground working tines or teeth can be set for working the ground to different and desired depths.

A still further object of my invention is to provide novel means for associating plant protecting skirts with the units, so that said skirts can be adjusted toward and away from one another and relative to the growing plants.

A still further important object of my invention is to provide means in the driving assembly for each tiller or cultivator unit for permitting slipping or discontinuance of the drive when the earth working implements striking a solid object, so that injury to the implements and the attachment will be prevented.

A still further important object of my invention is to provide novel means for associating the hoods and plant protecting skirts with the individual tiller units whereby the protecting hoods and skirts can be readily raised and lowered relative to the earth working implements or tines, and in accordance with the depth of penetration of the implements or tines in the ground.

A still further important object of my invention is to provide a novel parallelogram lever and link suspension for each tiller unit, whereby each tiller unit can float and be raised or lowered parallel to the ground and conveniently follow the contour of the ground by the use of a single supporting roller.

With these and other objects in view, the invention consists in the novel construction, arrangement and formation of parts, as will be hereinafter more specifically described, claimed, and illustrated in the accompanying drawings, in which drawings:

Referring to the drawings in detail, wherein similar reference characters designate corresponding parts throughout the several views, the letter A generally indicates my improved tiller or cultivator assemblage adopted for novel operative association with a tractor T. The tractor T is of the endless track type now commonly found in the open market, and hence the same will not be described in detail. However, the same includes a chassis 20 on which is mounted the power plant and other controls and the side endless tracks 21 and 22. The support for the tracks includes a rear axle housing 23. The endless tracks adjacent to their forward ends are resiliently connected as at 24 with the frame 20 and drive mechanism. Hence, the body of the tractor has limited up and down movement relative to the forward ends of the tracks.

My improved tiller or cultivator assemblage A includes a supporting frame 25 and this frame preferably includes a pair of spaced parallel supporting beams 26. The forward ends of the beams are connected by a front transversely extending beam 27 and the ends of this front beam extend beyond the longitudinal parallel beams 26. Secured to the front beam 27 are ground wheels 28 and these wheels are of the caster type so that turning of the attachment with the tractor will be facilitated. It is to be also noted that the wheels 28 are preferably in longitudinal alignment with the endless tracks 21 and 22.

The ground wheels 28 can, however, be adjustably clamped to the front bar 27 so that the wheels can be adjusted toward or away from one another.

The pair of spaced parallel supporting beams 26 extend longitudinally of the tractor T and their rear ends are disposed between the endless tracks 21 and 22 and the chassis or body 20. The rear axle housings 23 on each side of the body have firmly clamped thereto, collars 29 and the upper halves of these collars have formed thereon, upstanding ears 30. The extreme rear ends of the beams 26 carry flat feet 31 which are received between the pairs of ears 30 on the collars. Pivot pins 32 connect the feet 31 of the beams 26 with the ears 30. Consequently, the forward end of the tractor can have independent movement up and down of the beams and likewise the beams can also move up and down relative to the tractor. In order to keep the beams in proper alignment and to guide the same during the independent movement thereof relative to the tractor, one side of the tractor can have bolted, or otherwise fastened thereto, a guide strap 33. This guide strap embraces one of the beams and confines this beam in place.

It is to be also noted that the beams 26 are preferably of a telescoping nature so that the beams can be lengthened or shortened as may be desired so that different sizes of tractors can be accommodated and so that the tiller or cultivator can be set the desired distance in advance of the tractor. Hence, each longitudinal beam 26 includes a front section 34 and a rear section 35. The front sections of the beams telescope over the rear sections and the sections can be held in an adjusted set postion in any preferred way, such as by the use of set screws 36.

Also secured to the longitudinal beams 26 in spaced relation to the front beam 27 is an intermediate cross beam 37. This intermediate cross beam 37 also forms a part of the frame of the attachment A and this beam is firmly secured to the front longitudinal beam sections 34 in any preferred manner, such as by welding, or the like and, if desired, this intermediate cross beam 37 can be formed from facing channel structural units welded or otherwise fastened together. Openings can be formed in this cross intermediate beam 37 through which the longitudinal beams can extend.

Figure 1:
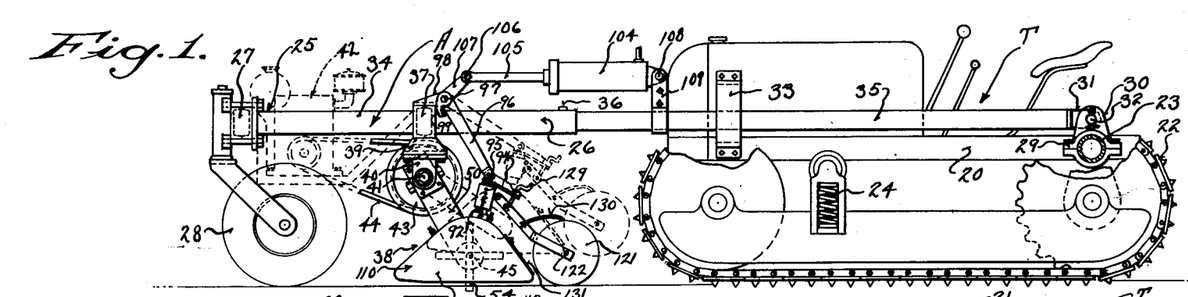
Figure 1 is a side elevational view of my improved ground tiller or cultivator and a tractor assembly, parts of the figure being shown broken away and in section.

The intermediate cross beam 37 forms the means for carrying and mounting the individual tiller or cultivator units 38 on the frame 26 of the assemblage, and these units will be later specifically described. It is to be noted, at the present time, that the beam 37 has welded, or otherwise fastened thereto, at spaced points, depending attaching blocks 39, and these blocks in turn have detachably bolted thereto bearing brackets 40. These bearing brackets are built to receive suitable ball or roller bearing races for supporting the main operating shaft 41. The shaft 41 is of a polygonal shape in cross section and extends the full length of the transverse cross beam 37. This shaft 41 is power driven, either from a power take-off from the tractor or from an independent prime motor 42 shown in dotted lines in Figure 1. Obviously, the frame 25 can be provided with any desired type of carrier for this engine. Keyed, or otherwise fastened to the shaft 41, is a pulley wheel 43 which is driven from a pulley belt 44. As indicated in Figure 1, this pulley belt can be driven from the engine 42.

Figure 2:
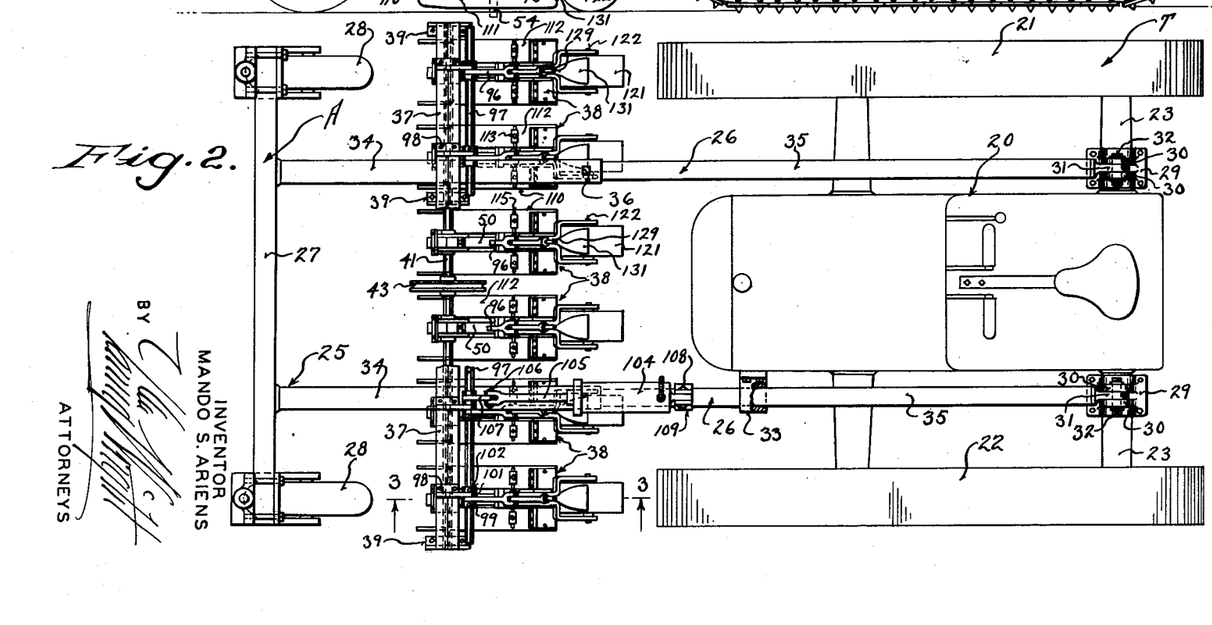
Figure 2 is a top plan view of the cultivator and tractor assembly.
Figure 3:
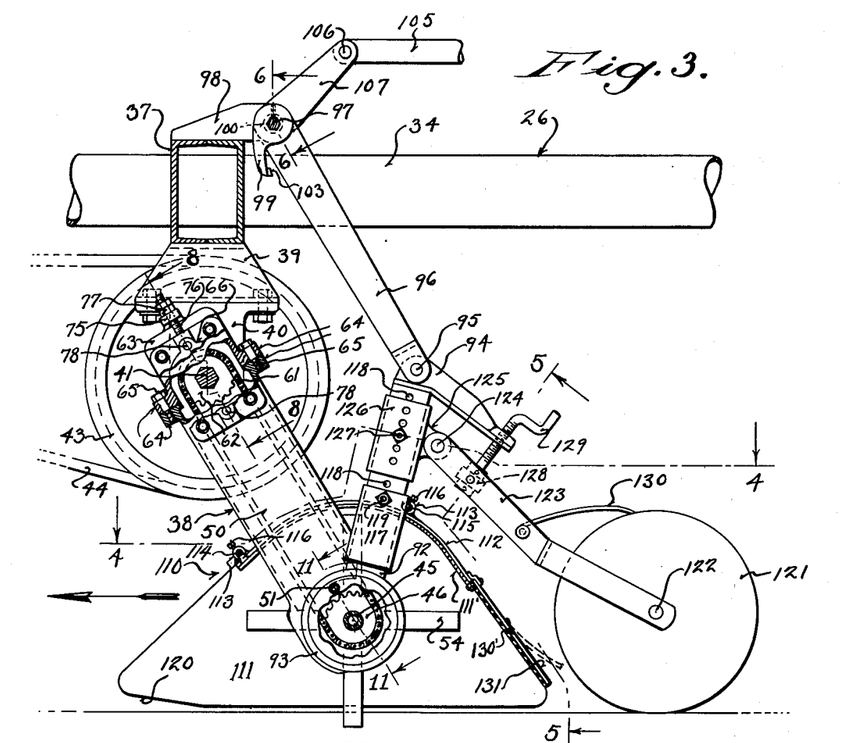
Figure 3 is an enlarged fragmentary vertical sectional view taken on the line 3—3 of Figure 2, looking in the direction of the arrows, illustrating one of the cultivator units.
Figure 4:
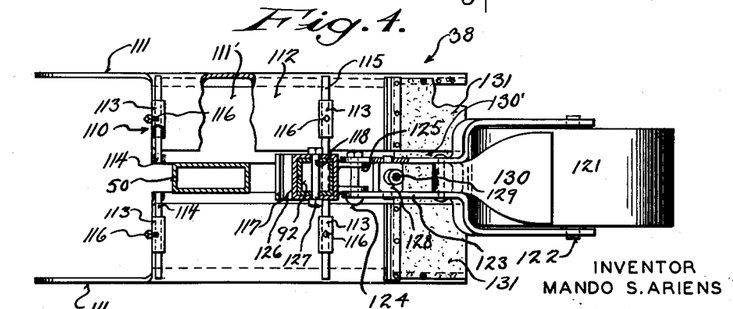
Figure 4 is a horizontal sectional view taken substantially on the line 4—4 of Figure 3, looking in the direction of the arrows and illustrating more particularly the improved hood and skirt construction.
Figure 5:
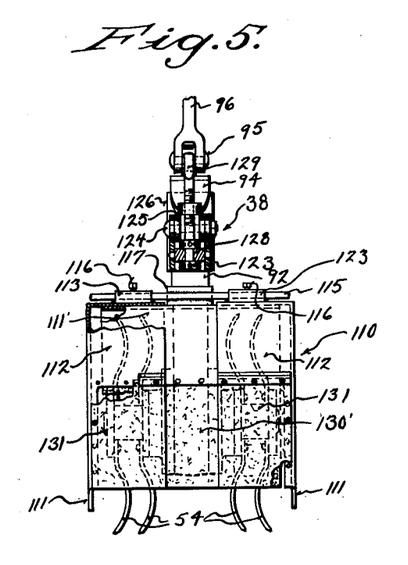
Figure 5 is a detail sectional view taken substantially at right angles to Figure 4 and on the line 5—5 of Figure 3 looking in the direction of the arrows, the view further illustrating details of the individual tiller unit.
Figures 6, 7:
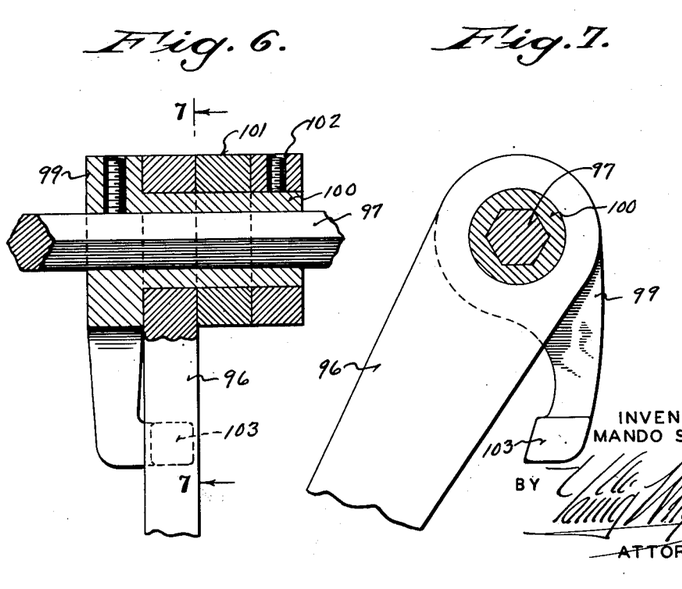
Figure 6 is a detail sectional view taken on the line 6—6 of Figure 3, looking in the direction of the arrows, illustrating improved means for simultaneously lifting the individual tiller or cultivator units, the view being on a larger scale than Figures 3, 4 and 5.
Figure 7 is a detail sectional view of the cultivator unit lifting mechanism taken on the line 7—7 of Figure 6, looking in the direction of the arrows.

Referring more particularly to the tiller or cultivator units, it will be noted, see Figure 2, that the units are mounted at equi-distant spaced intervals on the shaft 41. These units are so spaced that the rows of growing plants will go between adjacent units. There can be as many units 38 as desired, and in the present illustration I have shown six units, and hence five rows can be cultivated simultaneously.

However, the construction is such, as will later appear, that more or less units can be employed. Each tiller or cultivator unit 38 includes a short tiller shaft 45, having formed thereon or keyed thereto, a sprocket wheel 46. The shaft is preferably hollow with its ends internally threaded, as at 47, for a purpose, which will also later appear. On each side of the sprocket 46, the shaft is provided with bearing races 48 and these bearing races are received in bearing caps 49. The caps are fitted in the opposite sides of a hollow arm or casting 50 and the caps can be detachably secured to said arm by means of machine screws 51. Between the tiller shaft 45 and the bearing caps 49 and on opposite sides of the bearing races, can be placed oil retaining rings 52. A washer 53 can also be slid on the ends of the shaft against the oil sealing rings to hold the same in place.

The ends of each tiller shaft, on opposite sides of the supporting arm 50, carry the ground working teeth or tines 54, and obviously, the shape and character of these tines can vary according to the nature of the work being done.

From the description so far, it can be seen that the hollow casing or arm 50 carries and supports the tiller or cultivator shaft and forms a protection for the drive sprocket chain 61 which is trained about the sprocket wheel 46. This arm or casting 50 is suspended from the main drive shaft 41 for rocking movement and each tiller shaft 45 is rotated from this main drive shaft. Hence, the shaft 41 has mounted thereon for each tiller unit, a sprocket wheel 62 and the sprocket chain 61 of a tiller unit is trained about its respective sprocket wheel 62. The upper end of the hollow arm 50 detachably receives a cover plate 63 and the cover plate 63 and the adjacent end of the hollow arm 50 are provided with ears 64 for receiving holding bolts 65. This facilitates the connection of the arm with the shaft and the opposite sides of the arm carry bearing caps 66. Hubs 67 and 68 are each provided with axial polygonal bores 69 for a portion of their length and hence these hubs slip over the main drive shaft 41 and rotate therewith. The inner ends of the hubs have their bores enlarged to provide substantially cylindrical internal seats 70 for fitting over the ends of a drive sleeve 71. This drive sleeve 71 carries at its transverse center, the sprocket wheel 62 and the drive sleeve 71 is driven from one of the hubs; preferably the hub 68. The driving connection between the hub 68 and the sleeve 71 will be later described. It is to be noted, however, that the hubs 67 and 68 are secured on the shaft 41 by set screws 72 or other suitable means. These set screws are held against displacement and in an adjusted position by lock screws 73. The bearing caps 66 carry ball or roller bearing races 74 on each side of the sprocket wheel 62 and these races rotatably support the sleeve 71. The sleeve can be shouldered to form an abutment against which the races can be fitted.

To bring about the tightening or loosening of the sprocket chain 61, the bearing caps 66 can be supported by a cross strap 75 which can rest upon the upper end of the hollow arm or its closure cap 63. The strap 75 is adjustably connected to the rings by screws 76 and lock nuts 77 are provided for holding the screws and the strap in an adjusted position. Obviously, by turning the screw 76, the caps can be raised or lowered. The caps are maintained by proper transverse alignment by means of alignment pins 78 which can be inserted through registering openings 79 formed in said bearing caps 66.

The driving connection between the hub 68 and the hollow shaft or sleeve 71 is important, in view of the fact that if a solid object, such as a rock is struck by the cultivator teeth, it is imperative that the drive be temporarily interrupted so as to prevent injury to the teeth and other parts of the cultivator. In accordance with my invention, I provide one end of the hollow shaft or sleeve 71 with a series of substantially V-shaped teeth 80 arranged in an annular row. Engaging the teeth are driving pins 81 movable radially in openings 82 formed in the hub 68. The inner ends of the pins 81 are shaped to correspond to the spaces between the teeth 80 and the pins 81 are normally urged into driving engagement with the teeth 80 by a spring 83. The spring 83 can be a coil spring with the ends connected to form a circle and the spring is snapped over the outer ends of the pins and the spring normally functions to hold the pins inward. The outer ends of the pins 81 can be slotted as at 84 to form a guide for receiving the spring.

During normal driving conditions, the pins 81 and the spring 83 will function to effectively transmit the drive from the main shaft 41 to the hollow shaft or sleeve 71 and thence to the individual tiller shafts 45. If an obstruction is met with, a sufficient drag will be created on the sleeve 71 to cause the springing or forcing out of the pins 81 and the pins will merely ratchet over the teeth 80. When the obstruction is overcome, normal driving will be resumed. A removable dust ring 85 is provided for closing the annular groove 86 formed in the hub 68 for the reception of the spring 83.

It can be seen from the foregoing description that an effective drive has been provided for each tiller shaft and that each tiller hollow arm 50 can swing or turn on the hubs 67 and 68 which form a support therefor.

Other means can be provided for interrupting the drive between the main drive shaft 41 and the hollow shaft or sleeve 71.

Great stress is laid on the means for supporting the individual tiller units and for raising and lowering the individual tiller units, and the means for raising and lowering these units will now be described. Each tiller or cultivator unit is provided with a lift arm 92 and the lower end thereof is welded or otherwise secured to spaced bearing rings 93. These rings are rotatably mounted upon the outer faces of the bearing caps 49 carried by the lower end of the hollow arm or casting 50. Hence, the hollow lift arm 92 has turning movement relative to the lower end of the supporting arm or casing 50. The lift arm 92 terminates in a head 94 and this head in turn has pivotally connected thereto, as at 95, a lift link 96. The lift link 96 has its upper end mounted for turning movement on a rock shaft 97. This rock shaft 97 extends in spaced parallel relation to the main drive shaft 41 and the rock shaft is carried for turning movement by bearing brackets 98. These bearing brackets 98 are welded, or otherwise secured, to the intermediate cross beam 37. It is to be noted that the rock shaft 97 is also of a polygonal shape in cross section. The rock shaft has mounted thereon, for turning movement therewith, a lift crank lever 99 for each lift link 96. Each lift crank arm 99 is formed on a sleeve 100 and the sleeve has a polygonal bore to correspond to the shape of the polygonal rock shaft 97 for turning movement therewith. Each lift link 96 has its upper end rockably mounted upon its sleeve 100 and is held on the sleeve against lateral shifting movement by means of a ring 101 and a lock washer 102. Each crank arm 99 is provided with a laterally extending finger 103 which is disposed normally in advance of its lift link 96.

It can be seen that the tiller unit is free to swing up and down relative to the ground, but that upon turning movement of the rock shaft 97, the lift crank arms 99 can be brought into lifting contact with the links 96 for elevating all of the tiller units simultaneously.

The shaft 97 can be operated in any preferred manner for actuating the lift crank arms 99, but I prefer to provide a hydraulic lift mechanism.

This hydraulic lift mechanism includes a cylinder 104 having a piston (not shown) and an outwardly extending piston rod 105. The piston rod 105 is connected by means of a pivot pin 106 with the upper end of a crank lever 107, which is secured to shaft 97. The fluid control for the cylinder 104 has not been illustrated, as the hydraulic mechanism itself is of a well known construction found in the open market, but it is to be noted that when the piston rod 105 moves forwardly, the crank 107 will rotate the shaft 97 in a counter-clockwise direction (see Fig. 1) and all of the links 96 will be simultaneously raised and the cultivator units will be lifted off of the ground to the dotted line position shown in Fig. 1. Attention is called to the fact, however, that the rear end of the cylinder is pivotally connected, as at 108, to a bracket 109 mounted upon one of the beams 34.

Attention is again invited to the fact that the links 96 are in parallel relation to the hollow supporting arms 50 and, consequently, the tiller units will be raised in a parallel motion to the ground. This is important, as during the normal cultivating operation the units can raise and lower parallel to the ground.

In conjunction with each tiller unit 38, I utilize a novel guard arrangement for protecting the growing plants from the cultivator teeth or tines 54 and for preventing dirt from being thrown over the growing plants. The guard also functions to aid in breaking up or pulverizing clods of earth. These guard shields are generally indicated by the reference characters 110 and the guard shield for each tiller unit includes side spaced parallel rigid guard plates 111. The upper edges of the guard plates are provided with inturned top guard walls 112 and these walls project toward the hollow supporting arms 50 and the hollow lift arm 92. At spaced points these top walls 112 carry front and rear sleeves 113 and these sleeves are slidably mounted on front and rear supporting rods 114 and 115. Hence, the top walls 112 with their side guard plates 111 can be adjusted toward and away from one another on said rods, and the walls 112 are held in a selected adjusted position on the rods by set screws 116. These set screws extend through the sleeves and into binding engagement with the rods.

The rear rod 115, at its central portion, is welded to a sliding cuff 117, and this cuff is adjustably mounted on the hollow lift arm 92. The lift arm can be provided with a row of equidistantly spaced openings 118. A removable bolt 119, carried by the cuff 117, can be selectively inserted in a desired opening so that the protecting shields will be held the desired distance relative to the ground.

The shield 110 also includes a central slotted guard plate 111' which is welded or otherwise fastened to the cuff 117 for adjustment therewith. The front rods 114 are welded to the guard plate 111'.

The lower edges of the side shield plates 111 extend parallel to the ground for the major portion of their length and the extreme front portions of these edges can be beveled or inclined upwardly at an angle, as at 120, so as to facilitate the riding of these shields over clods of earth.

Each cultivator unit is supported in its travel over the ground by a following roller or wheel 121. This roller is disposed directly in the rear of the shields and centrally of the longitudinal axis of the shield. The roller for each unit is rotatably mounted on an axle 122 carried by the forked end of a supporting bracket 123. The upper forward terminal of the supporting bracket is rockably mounted on a pin 124 carried by ears 125 formed on a second adjustable cuff 126. This second cuff is also slidably mounted on the hollow lift arm 92 and is held in an adjusted position thereon by a bolt 127, which can be placed in any desired opening of the row of openings 118. Each supporting wheel bracket 123 pivotally carries a bearing 128 and this bearing rotatably receives the lower end of an operating crank 129. This crank is threaded into the rear end of the head 94. Due to the fact that the crank 129 is rotatably mounted in the bearing 128 but held against longitudinal movement therein, it can be seen that when the crank is turned, the bracket 123, with its roller 121, can be swung up and down for raising and lowering the tiller unit the desired distance relative to the ground. A scraper blade 130 can be carried by each bracket 123 for engaging the periphery of the roller 121.

A flexible skirt 130' is secured to the rear edge of the guard plate 111'. Flexible skirts 131 can be carried by the rear ends of the side guard plates for confining the dirt within the shield. These skirts 131 are preferably made of rubber and can be fastened by screws or other suitable means to sides and rear ends of guard plates 111. This provides a means of controlling the flow of dirt from under the shields during operation or confining it entirely so that small plants will not be covered with soil during cultivation.

From the foregoing description, it can be seen that I have provided a novel means for operatively associating a rotary cultivator assembly in articulated relation with the forward end of a tractor, whereby the operator can accurately guide the units between growing rows of plants and that an exceptionally simple means is provided for allowing independent movement of the tiller units, for simultaneously raising all of the tiller units and for accomplishing adjustment of the tiller units for various row spacings, varying row widths, for varying depth of cultivation and adjustment of the shield with relation to the ground as well as to provide means of controlling dirt flow from underneath the shield while cultivating.

Obviously, my invention is not limited to tractors of the endless track type and the attachment can be advantageously used with tractors of the wheel type.

In some instances, it may be desirable to forcibly and resiliently urge the cultivator units toward the ground, such as when the tines are working in hard soil, this can be accomplished by resiliently urging the individual lift links for the units toward the ground. In Figures 21 to 23 inclusive I have illustrated one form of means for individually urging the lift links for each cultivator unit toward the ground. In these figures the lift rock shaft is indicated by the reference character 152 and this rock shaft has secured thereto for movement therewith a sleeve 153. The sleeve has formed thereon or secured thereto for movement therewith a lift crank arm 154. The lower end of the lift crank arm terminates in a laterally extending finger 155. Rotatably mounted on the sleeve 153 is a lift link 156 and this lift link corresponds to the lift link 96 shown in Figures 1 to 7 inclusive. Obviously when the rock shaft 152 is rotated by the operator the lift crank 154 will move toward the lift links and when the fingers 155 engage the links the links will be rocked to elevate the individual units. The lift link 156 can be held against lateral shifting movement on the sleeve 153 by a lock ring 158. The sleeve itself can be held in an adjusted position along the length of the rock shaft by a set screw 159. The means for urging each lifting link downwardly consists of a heavy spring 160. The spring 160 has a portion thereof coiled about a spool 161 and one end of the spring is anchored to the spool by a machine screw or the like 162. The spool itself is mounted for turning movement on a stud 163 carried by the lift crank and lateral shifting movement of the spool on the stud is normally prevented by a nut 164 threaded on the stud. The spring is provided with an arm 165 which terminates in a hook 166 and this hook engages over and against the lift link 156. The inner face of the spool 161 is provided with an annular row of openings 167 and the spool can be turned and shifted laterally so that any one of the openings can receive a pin 168 rigidly carried by the lift crank 154. Obviously by turning the spool the tension of the spring can be increased or decreased.

The arm 165 of the spring normally bears down on the lift link 156 and consequently this link and its tiller unit is normally and resiliently urged toward the ground.

Figures 8, 9, 10:
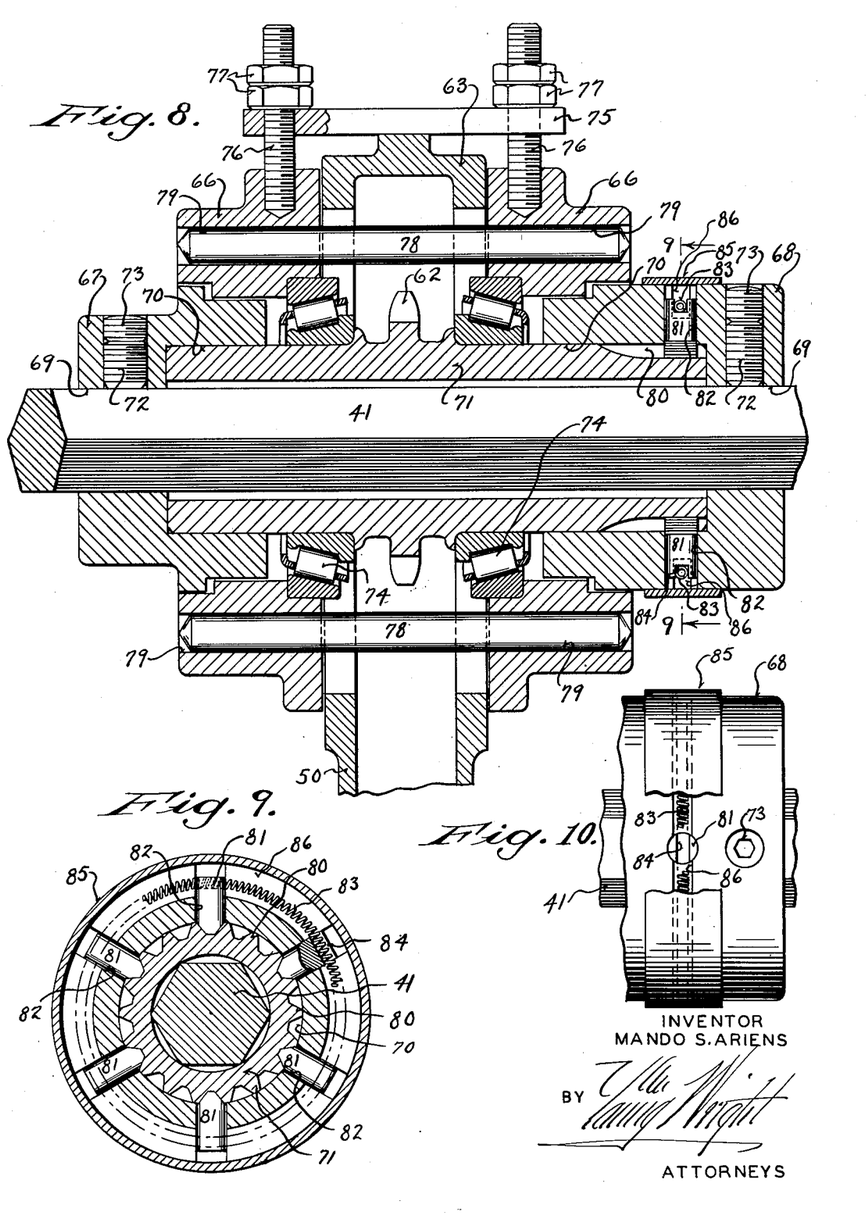
Figure 8 is an enlarged fragmentary detail longitudinal sectional view, taken on the line 8—8 of Figure 3, looking in the direction of the arrows, illustrating the novel drive assembly for the upper end of a tiller and cultivator unit.
Figure 9 is a detail transverse sectional view taken on the line 9—9 of Figure 8, looking in the direction of the arrows, illustrating the means employed for permitting slipping of the drive for a unit when an obstruction is encountered.
Figure 10 is an enlarged fragmentary detail plan view with parts broken away, illustrating the means for permitting the slipping of the drive.
Figures 11, 12:
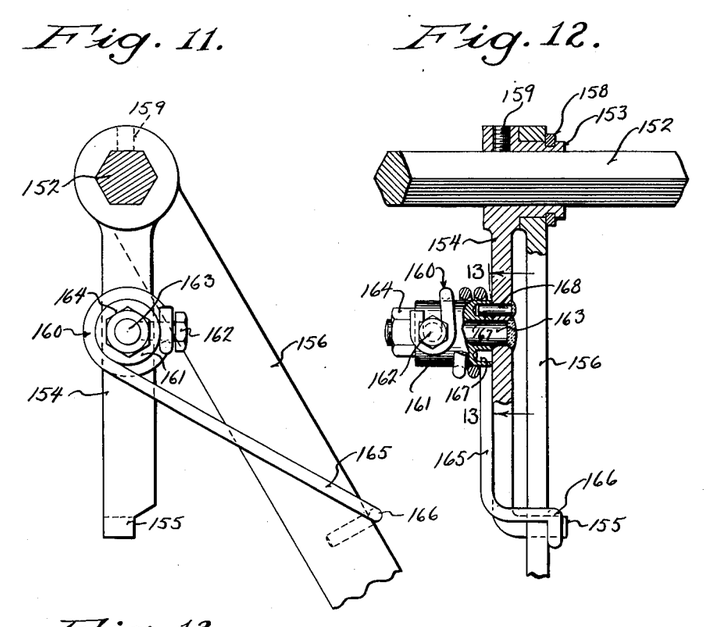
Figure 11 is an enlarged fragmentary transverse sectional view through the rock shaft for obtaining the simultaneous lifting of the cultivator units, the view illustrating the means for holding individual units in a lowered position for operatively engaging the soil.
Figure 12 is a fragmentary sectional view taken at right angles to Figure 11 showing the resilient means for holding the lift link for a cultivator unit in a lowered position.
Figure 13:
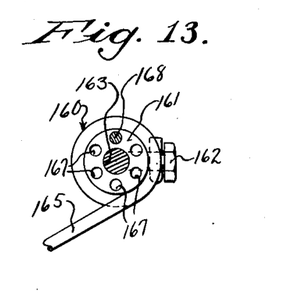
Figure 13 is a detail sectional view taken substantially on the line 13—13 of Figure 12 looking in the direction of the arrows, illustrating the means for increasing or decreasing the tension of a holding spring for one of the lift links.
Figure 14:
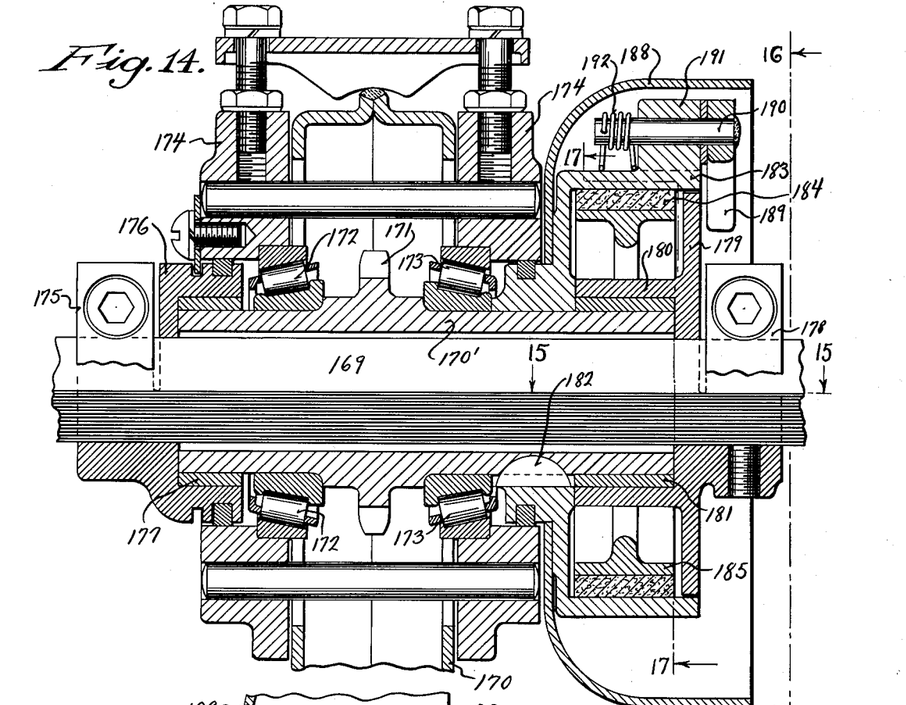
Figure 14 is an enlarged fragmentary longitudinal sectional view similar to Figure 8, but illustrating a further modified form of slip clutch and the warning alarm for the operator upon the slipping of the clutch.
Figure 15:
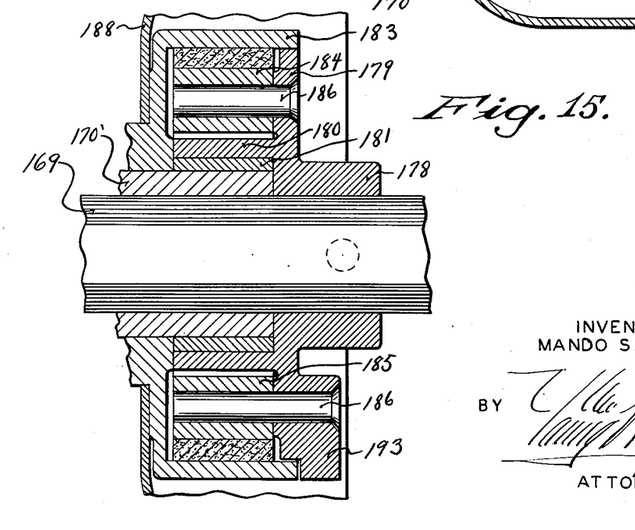
Figure 15 is a detail sectional view through the slip clutch taken substantially on the line 15—15 of Figure 14 looking in the direction of the arrows.

In Figures 8 to 10 inclusive I have shown one form of slip clutch for the drive to the individual tiller units and in Figures 14 to 17 inclusive I have shown another form of slip clutch and a warning alarm for the operator.

In these figures the main operating shaft is indicated by the reference character 169 and the individual tiller units are rockably mounted on the shaft and the individual tiller shafts are driven therefrom. The hollow casing or arm 170 for each unit receives the rotatable sleeve 170' carrying the sprocket 171 for the tiller shaft and this sleeve is rotatably supported in roller bearings 172 and 173 carried by end bearing caps 174. Longitudinal shifting movement of the arm in one direction on the shaft 169 is prevented by a split collar 175 which is clamped to the shaft 169 for rotation therewith. This split collar 175 carries a bearing 176 in which one end of the drive sleeve 170' is received and a bearing ring 177 is placed between the sleeve 170' and the bearing 176. The arm on its opposite side receives a similar split collar 178 which is firmly clamped to the shaft 169. This collar has formed thereon a slip clutch plate 179 and a bearing flange 180. This bearing flange rotatably receives the sleeve 170' and a bearing ring of antifriction metal 181 can be disposed between the flange 180 and the drive sleeve 170'. Keyed to the drive sleeve 170', as at 182 is a slip clutch drum 183 and bearing against the drum are clutch shoes 184 and 185. These clutch shoes are rockably mounted on pivot pins 186 carried by the slip clutch plate 179. Expansion springs 187 are employed for urging the shoes into engagement with the slip clutch drum 183. From the description so far, of this form of my invention, it can be seen that the drive sleeve 170' is normally driven from the drive shaft 169 through the split collar 178, slip clutch plate 179, shoes 184 and 185 and the drum 183. When the tiller tines strike a solid object and the sleeve 170' is held against rotation the drum 183 will merely slide over the shoes 184 and 185 and injury to the working parts will be prevented.

Figure 16:
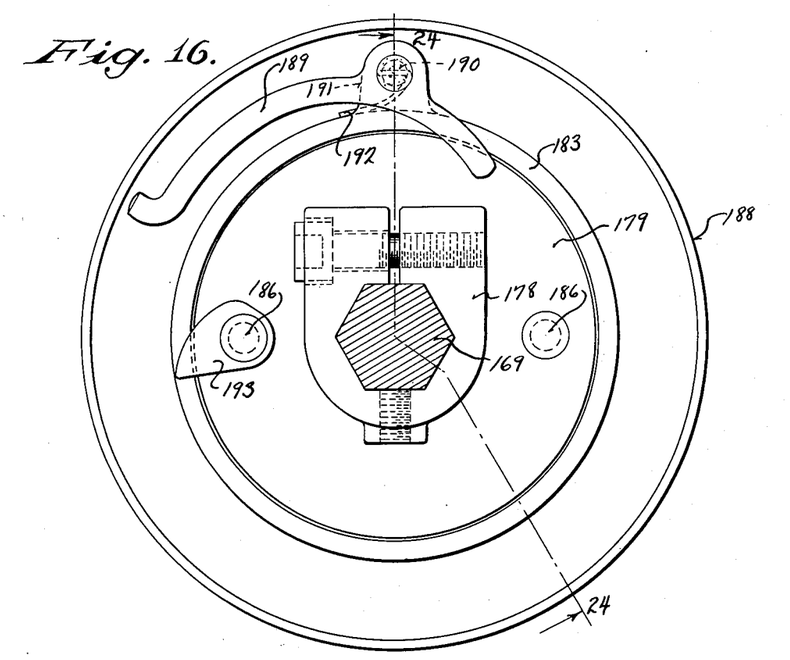
Figure 16 is a sectional view taken at right angles to Figure 14 and substantially on the line 16—16 of Figure 14 looking in the direction of the arrows illustrating the warning alarm in detail.
Figure 17:
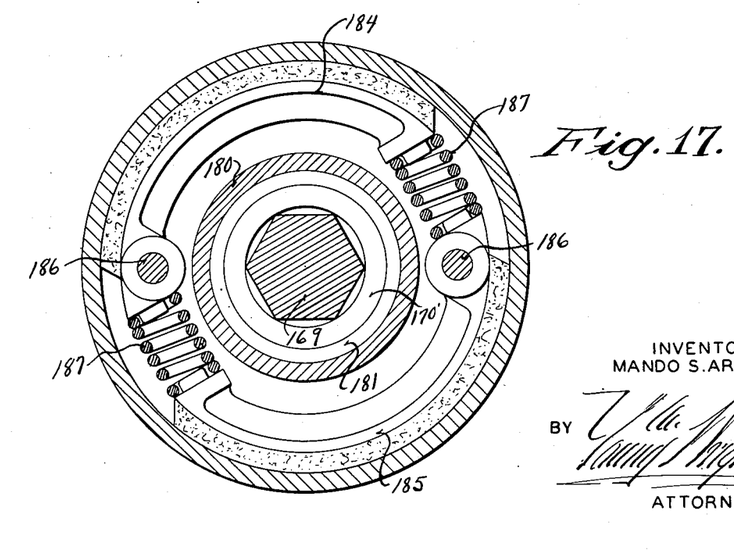
Figure 17 is a detail sectional view through the sleeve clutch mechanism taken substantially on the line 17—17 of Figure 14 looking in the direction of the arrows.

In order to warn the operator that a solid object has been encountered, I provide a novel alarm mechanism. This alarm mechanism includes a bell 188 which is firmly fastened to the drum 183. A pivoted clapper 189 is provided for the bell and this clapper is rockably mounted intermediate its ends on a pivot pin 190 carried by an ear 191 formed on the drum 183. The striking end of the clapper is normally urged toward the bell by a spring 192. The inner end of the clapper normally extends inwardly toward the clutch disc 179 and rigidly secured to one of the pins 186 for the clutch shoes is a trip cam arm 193. Obviously this cam trip arm rotates with the slip clutch disc 179. During the normal driving of the driven shaft carrying the tiller tines, the disc 179, the drum 183 and the bell 188 turn together as a unit. When a solid object is encountered the drum 183, the bell 188 and its clapper 189 remain stationary and the trip 193 rotating with the disc will strike the short arm of the clapper; rocking the clapper against the tension of its spring 192. As the trip rides past the short arm of the clapper the spring will forcibly urge the clapper into contact with the bell giving a sharp resounding tone. This operation will continue until forward movement of the tractor and tiller is stopped. Obviously the sounding of the bell gives the operator a warning that a solid object has been encountered.

Changes in details may be made without departing from the spirit or the scope of my invention, but what I claim as new is:

1. In a power driven cultivator unit, a rotating shaft, a drive shaft therefore, a lift shaft, ground working tines carried by the rotating shaft, a lift arm rockably mounted about the rotating shaft, the rotating shaft and the end of the lift arm being pivotally and rockably connected to the drive shaft and lift shaft respectively in the form of a parallelogram, a ground engaging supporting wheel carried by the lift arm, and means for raising and lowering the ground engaging wheel relative to the ground and the lift arm.

2. In a power driven multiple row cultivator, a plurality of independent transversely spaced cultivator units each including a rotary tiller shaft, a supporting arm for the shaft, means for rotatably supporting the shaft from said arm including removable hub caps carried by the opposite sides of the arm, bearings carried by said hub caps for the tiller shaft, means for raising and lowering the tiller shaft and supporting arm including rings rotatably mounted on the hub caps, and a lift arm rigidly secured to said rings.

3. In a power driven multiple row cultivator, a cultivator unit including a drive shaft, a sleeve rotatably mounted on said shaft, means for driving the tiller unit from the sleeve, a clutch disc secured to said shaft for rotation therewith, a slip clutch drum secured to the sleeve, clutch shoes carried by the disc and engaging said drum for normally setting up a driving connection between the disc and drum, and means for sounding an alarm upon the slipping of the disc and drum relative to one another.

4. In a power driven multiple row cultivator, a cultivator unit including a drive shaft, a sleeve rotatably mounted on said shaft, means for driving the tiller unit from the sleeve, a clutch disc secured to said shaft for rotation therewith, a slip clutch drum secured to the sleeve, clutch shoes carried by the disc and engaging said drum for normally setting up a driving connection between the disc and drum, and means for sounding an alarm upon the slipping of the disc and drum relative to one another, including a bell rotatable with the drum and trip arm on the disc for actuating the clapper upon slipping of the disc relative to the drum.

5. In a power driven multiple row cultivator, a frame, a floating cultivator unit mounted below the frame including a rotary cultivator shaft, a supporting arm rotatably carrying at its lower end the cultivator shaft, means rockably connecting the upper end of the supporting arm to the frame, a lift arm disposed at an angle to the supporting arm rockably connected to the lower end of the supporting arm, a connecting link pivotally connected to the upper end of the lift arm and to the frame above the pivot point of the upper end of the supporting arm, said link being disposed in spaced parallel relation to the supporting arm, said supporting arm, the lift arm, and the link defining a parallelogram with said frame, and a depth regulating ground engaging wheel supporting the cultivator unit connected to the lift arm, whereby the cultivator unit will describe a pantographic motion as the wheel passes over varying contours of ground.

6. In a power driven multiple row cultivator as defined in claim 5, means independent of said wheel for raising the cultivator unit and wheel on the frame above the ground.

7. In a power driven multiple row cultivator as defined in claim 5, resilient means normally urging the cultivator unit and wheel toward the ground.

8. In a power driven multiple row cultivator as defined in claim 5, a hood for the cultivator shaft secured to and movable with the lift arm.

9. In a power driven multiple row cultivator, a frame, a floating cultivator unit disposed below said frame including a cultivavtor shaft, a supporting arm rotatably carrying at its lower end the cultivator shaft, means rockably connecting the upper end of the supporting arm to the frame, a lift arm disposed at an angle to the supporting arm rockably connected at its lower end to the lower end of the supporting arm, a link pivotally connected to the upper end of the lift arm and to the frame above the pivot point of the upper end of the supporting arm, said link being disposed in spaced parallel relation to the supporting arm, said supporting arm, the lift arm and the link defining a parallelogram with said frame, a depth regulating ground engaging wheel supporting the cultivator unit connected to the lift arm, and means for raising the cultivator unit to an inoperative position above the ground including a crank arm normally out of engagement with the link for permitting free movement of the link and means actuating the crank arm for moving the same in engagement with the link for raising said link.

10. In a power driven multiple row cultivator as defined in claim 5, means for varying the position of the depth regulating ground wheel relative to the cultivator shaft.

11. In a power driven multiple row cultivator as defined in claim 5, a hood for said cultivator shaft carried by the lift arm and movable therewith, and means for adjusting the hood on said lift arm.

12. In a power driven cultivator unit, a frame, a rotating cultivator shaft, ground working tines carried by the shaft, a lift arm rockably mounted about the rotating shaft, a movable parallelogram suspension for the shaft including the lift arm, a connecting link and a supporting arm, and rockable and pivotal connections at the corners of the parallelogram, said rockable and pivotal connections including means pivotally connecting the link to the lift arm and to the frame and the supporting arm to the frame, a hood secured to the lift arm partially encasing the tines, and an adjustable depth regulating wheel secured to the lift arm engaging the ground for raising and lowering the rotating shaft and hood in parallel relation to the ground at all times.

MANDO S. ARIENS.

REFERENCES CITED

The following references are of record in the file of this patent:

UNITED STATES PATENTS

| Number | Name | Date |
| --- | --- | --- |
| 1,523,072 | Ingersoll | Jan. 13, 1925 |
| 1,659,090 | Emmons | Feb. 14, 1928 |
| 1,744,597 | Vasconcellos | Jan. 21, 1930 |
| 1,872,237 | Brown | Aug. 16, 1932 |
| 1,877,777 | Reynolds | Sept. 20, 1932 |
| 1,886,691 | Johnson | Nov. 8, 1932 |
| 2,113,666 | Suman | Apr. 12, 1938 |
| 2,232,523 | Gray | Feb. 18, 1941 |
| 2,239,961 | Hipple | Apr. 29, 1941 |
| 2,249,630 | James | July 15, 1941 |
| 2,294,188 | Kuntz | Aug. 25, 1942 |
| 2,317,188 | Hanson | Apr. 20, 1943 |
| 2,364,043 | Ariens | Dec. 5, 1944 |
| 2,366,386 | Clark | Jan. 2, 1945 |
| 2,370,777 | Clark | Mar. 6, 1945 |
| 2,442,731 | Paul | June 1, 1948 |